(12) United States Patent
Kalm

(10) Patent No.: US 10,759,611 B1
(45) Date of Patent: Sep. 1, 2020

(54) HANDLING SYSTEMS AND METHODS FOR REORIENTING INVENTORY ITEMS

(71) Applicant: Amazon Technologies, Inc., Seattle, WA (US)

(72) Inventor: William Scott Kalm, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/450,523

(22) Filed: Jun. 24, 2019

(51) Int. Cl.
*B65G 47/252* (2006.01)
*B65G 47/24* (2006.01)

(52) U.S. Cl.
CPC .................................. *B65G 47/24* (2013.01)

(58) Field of Classification Search
CPC ............... B65G 47/24; B65G 47/1492; B65G 21/2054; B65G 47/1457; B65G 47/1428; B65G 47/248; B65G 47/244; B65G 47/2445; B65H 67/061
USPC ..... 414/784, 405, 416.05, 416.06, 418, 419, 414/420, 757, 759, 768, 769, 773, 779, 414/782, 788.5; 193/44, 45, 46, 48; 198/380, 383, 389, 394, 402, 406, 407, 198/410, 415, 416, 417, 454, 455, 786; 271/185
See application file for complete search history.

(56) References Cited

U.S. PATENT DOCUMENTS

| | | | | |
|---|---|---|---|---|
| 2,667,958 A * | 2/1954 | Malhiot | .................. | B65B 35/24 198/468.1 |
| 3,462,001 A * | 8/1969 | Boyce | ................. | B65G 47/2445 198/415 |
| 4,411,350 A * | 10/1983 | Wolfram | ................. | B65G 13/00 193/35 A |
| 4,479,574 A * | 10/1984 | Julius | ..................... | B65G 15/50 134/125 |
| 5,074,400 A * | 12/1991 | Focke | ..................... | B65B 35/58 198/415 |
| 5,398,801 A * | 3/1995 | Langen | ................. | B65G 47/248 198/407 |
| 5,609,237 A * | 3/1997 | Lenhart | ................ | B65G 47/248 198/406 |
| 7,055,672 B2 * | 6/2006 | Holmgren | ............ | B65G 47/244 198/444 |
| 7,175,017 B2 * | 2/2007 | Carey | .................... | B65G 13/12 198/401 |
| 8,561,782 B2 * | 10/2013 | McCarry | ................ | B65G 47/24 198/369.3 |

* cited by examiner

*Primary Examiner* — Gregory W Adams
(74) *Attorney, Agent, or Firm* — Kilpatrick Townsend & Stockton LLP

(57) ABSTRACT

An orienting apparatus configured to reorient an inventory item supplied to a packaging machine includes an inlet, an outlet having an aspect ratio less than one, a translation device, a vertically oriented guide, and an orienting guide. The translation guide drives the inventory item from the inlet towards the outlet. The vertically oriented guide is positioned between a first lateral side of the inlet and a first lateral side of the outlet. The orienting guide is positioned between a second lateral side of the inlet and a second lateral side the outlet. The vertically oriented guide and the orienting guide define a channel through which the inventory item is conveyed. The orienting guide interfaces with the inventory item to progressively reorient the inventory item as the inventory item is conveyed through the channel.

20 Claims, 11 Drawing Sheets

HANDLING SYSTEMS AND METHODS FOR REORIENTING INVENTORY ITEMS

BACKGROUND

A packaging machine is often used to package an item for shipping. A packaging machine can package the item in a suitable enclosure, such as an envelope, bubble wrapping, or box. Some packaging machines require items to be supplied to the packaging machine in a particular orientation for packaging. For example, bubble mailer and envelope style packaging machines may require thin items to be supplied to the packing machine in a vertical orientation for proper packaging. Additionally, automated systems for feeding packaging machines increase throughput and efficiency as compared to manual feeding of items to packaging machines.

BRIEF DESCRIPTION OF THE DRAWINGS

Various embodiments in accordance with the present disclosure will be described with reference to the drawings, in which.

DETAILED DESCRIPTION

Figure 1:
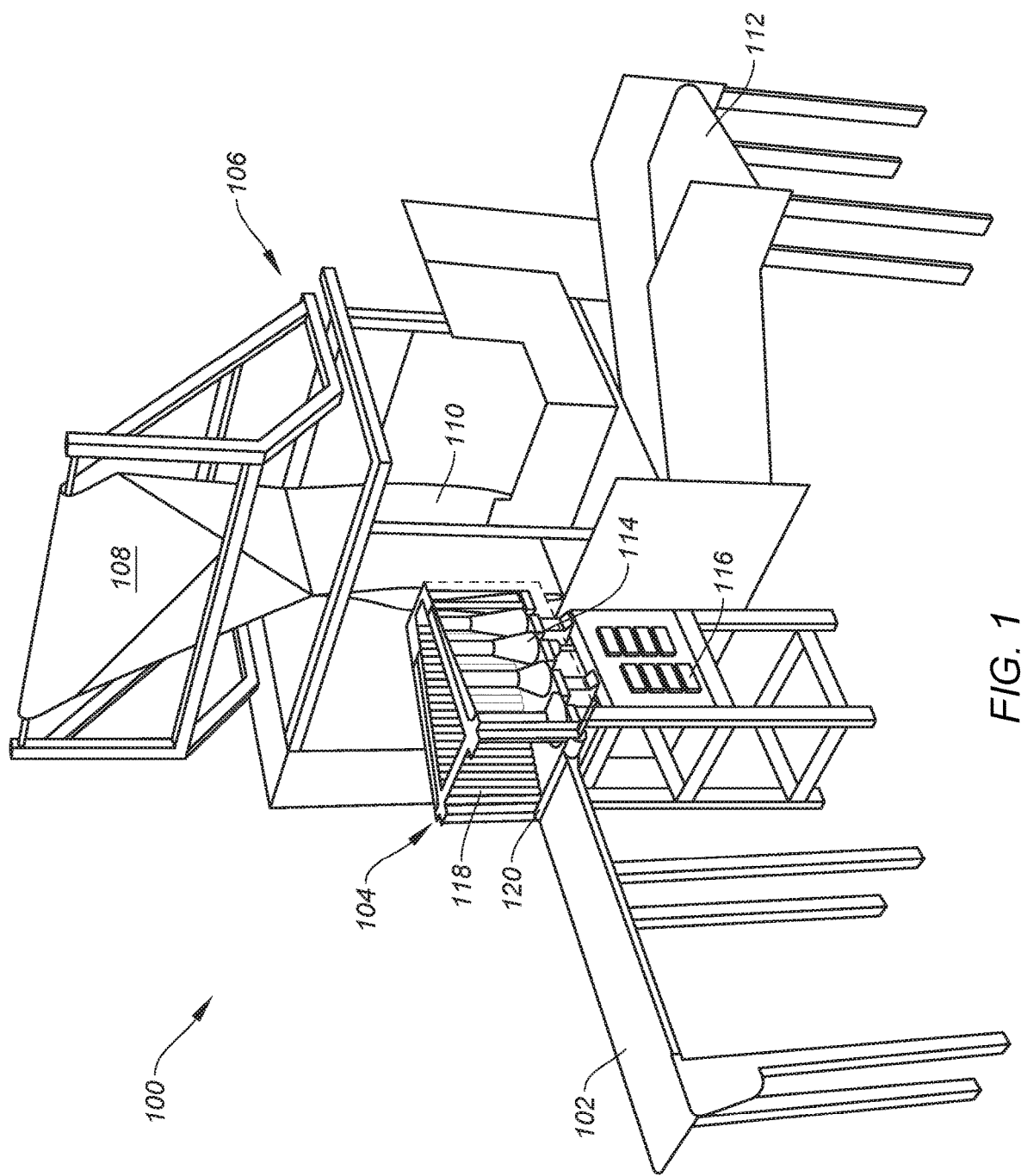
FIG. 1 illustrates an inventory handling system that includes a packaging machine an orienting apparatus that orients items supplied to the packaging machine, in accordance with embodiments.

Embodiments and approaches described herein are directed to inventory handling systems, particularly automated packaging systems that include a packaging machine and an orienting apparatus that reorients inventory items so that the inventory items are supplied to the packaging machine in a particular orientation. In many embodiments, the orienting apparatus receives inventory items either from a worker or a belt-fed system and automatically rotates the inventory item to an orientation required by the inlet of the packaging machine. In many embodiments, the orienting apparatus can receive an inventory item that is elongated along an elongation axis, and reorient the inventory item from an incoming orientation in which the elongation axis is substantially horizontally oriented to an output orientation in which the elongation axis is substantially vertically oriented. The orienting apparatus outputs the reoriented inventory item, which is supplied to the packaging machine in the output orientation.

In many embodiments, the orienting apparatus is configured to propel the inventory item through the orienting apparatus and reorient the inventory item to a preferred output orientation while the inventory item is propelled through the orienting apparatus. For example, an orienting apparatus can include guide elements that propel the inventory item through the apparatus and reorient the inventory items into a substantially vertical output orientation. The guide elements can include a series of rollers that are shaped and positioned so as to define a transport channel through which the inventory items passes. In many embodiments, the transport channel has a width that converges from an inlet width to a suitable outlet width for output of the inventory item in the substantially vertical output orientation. In many embodiments, a suitable number of the rollers are drivingly rotated so that the rotating rollers propel the inventory item towards the outlet. In some embodiments, the rollers on one side of the transport channel include a series of conical sections that increase in height progressively from the inlet to the outlet. As the inventory item contacts the conical sections, the progressively increasing height and progressively narrowing channel causes the inventory item to rotate into the substantially vertical output orientation for input into a packaging machine.

Because embodiments described herein allow automated orientation and insertion of inventory items into a packaging machine, greater numbers of inventory items may be packaged, thereby saving time and expense. Additionally, the use of a standalone orienting and insertion unit allows simple access and maintenance to be performed on the packaging machine by simply moving the orienting apparatus out of position and back into position when maintenance is complete. This also allows all safety features of the packaging machine to remain intact and operational, without any modification necessary, to interact with automated insertion devices such as the orienting apparatus described herein.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates a perspective view of a system 100 for packaging inventory items including a packaging machine 106 with an orienting apparatus 104 and conveyor belt 102 feeding into the packaging machine 106 in an example environment. The packaging machine 106 is a bubble mailer packaging machine for enclosing inventory items in a durable, moisture resistant polyethylene film that is ready for shipment. The packaging machine 106 is capable pf packaging many inventory items per minute, for example the packaging machine 106 may be configured to package up to twenty inventory items per minute or more.

The packaging machine 106 includes a single sheet or roll of packaging material 108 which is fed over an upper portion of the packaging machine and folded longitudinally to form an unsealed envelope 110. The packaging material 108 may include multiple layers such as polyethylene film, bubble wrap, paper-backed plastic films, or other similar materials suitable for shipment packaging. The unsealed envelope 110 is open at one end, where inventory items are inserted by the orienting apparatus 104. The unsealed envelope 110 has a primarily vertical opening, meaning an open end for filling which extends primarily in a vertical direction. The opening may be of a particular size, selected based on the typical size or size range of inventory items to be packaged. After an inventory item is inserted into the unsealed envelope, the packaging machine 106 seals the unsealed envelop 110 to form a shipping pouch and separates the shipping pouch from the sheet of packaging material 108 and delivers the shipping pouch with the inventory item via a conveyor belt 112 for further processing or shipment.

In some examples, the packaging machine 106 may apply labels to the shipping pouch to prepare for shipment or otherwise prepare inventory items to ship. Additionally, other configurations of packaging machines 106 are contemplated, including those which receive two or more sheets of packaging material 108 to form unsealed envelope 110.

Orienting apparatus 104, described in further detail below, includes an inlet and an outlet through which inventory items are received and delivered. At the inlet of orienting apparatus 104, inventory items are introduced with a conveyor belt 102, though in some examples the orienting apparatus 104 may be fed by a worker, low friction surface, sloped surface, or other item handling equipment. Additionally, a driving roller 120 at the inlet of orienting apparatus 104 provides momentum to the inventory item to propel it through the orienting apparatus 104. The inventory item, having an aspect ratio greater than one, or in other words having a width greater than the height of the inventory item, or in other words having an elongation axis along which the item is elongated and the elongation axis being primarily horizontal, may be received at the inlet of orienting apparatus 104 in a substantially horizontal orientation and through the interaction of the inventory item with guide rollers 118 and orienting rollers 114, the inventory item is rotated into a substantially vertical orientation ready for insertion into the unsealed envelope 110. The guide rollers and the orienting rollers 114, as well as other elements of the system including the conveyor belt 102 and driving roller, are controlled by a computer system 116 including elements and features as described with respect to FIG. 11 below.

Figure 2:
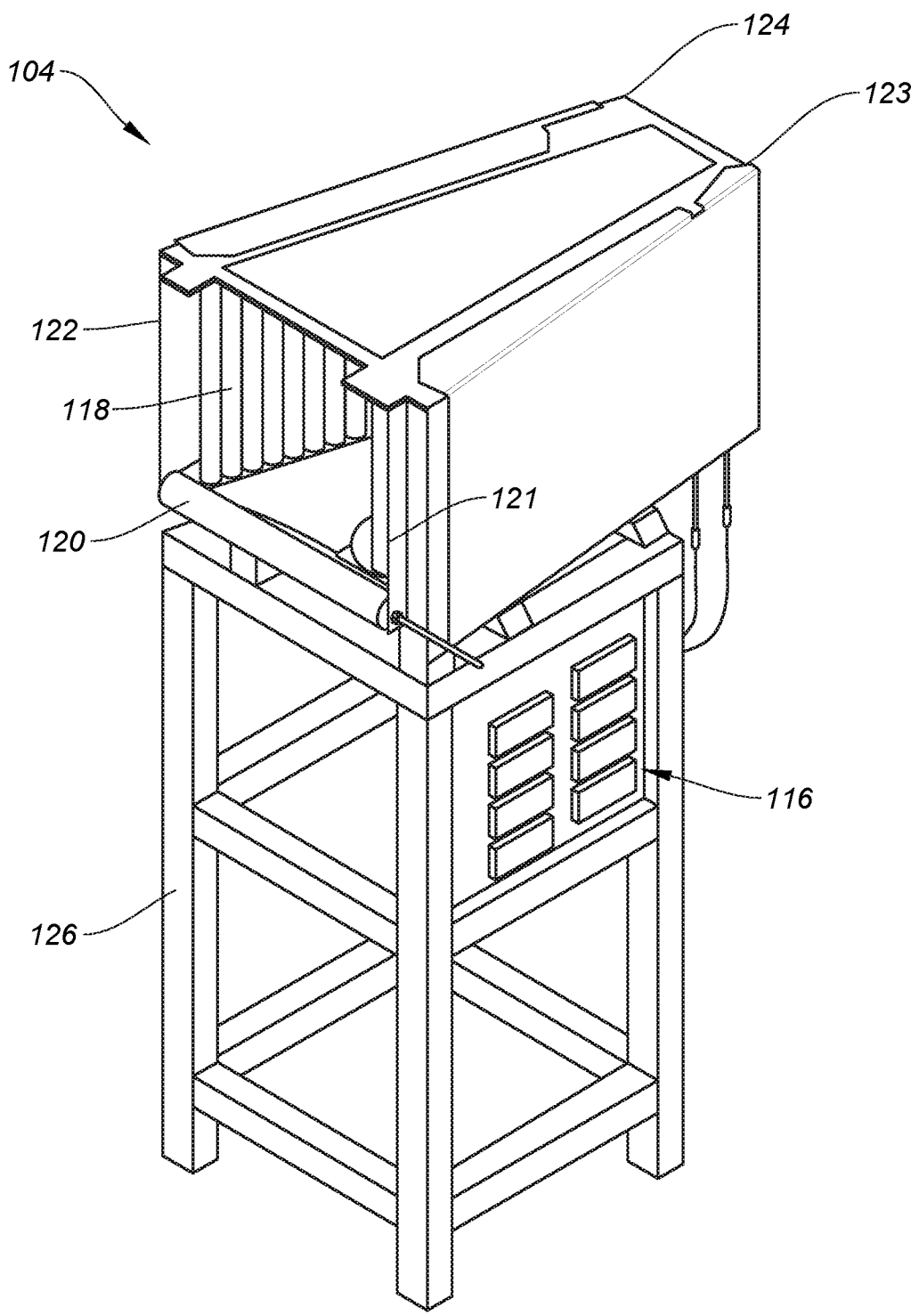
FIG. 2 further illustrates the orienting apparatus of FIG. 1.

FIG. 2 depicts a perspective view of the orienting apparatus 104 of FIG. 1. The orienting apparatus 104 is supported by a base 126, which maintains the outlet of the orienting apparatus 104 at the proper height to interact with the unsealed envelope 110 of the packaging machine 106. In some examples, the base 126 may be height adjustable, to allow for different heights or positions of unsealed envelopes 110. The base 126 additionally supports the computer system 116 which controls the function of the elements of the orienting apparatus, including the guide rollers 118 and the orienting rollers 114.

At the inlet of the orienting apparatus, the driving roller 120 is located at and defines a bottom of the inlet. The driving roller 120 is a motor driven roller ("MDR") controlled by computer system 116. An MDR includes a motor powered by a 24 volt power supply. The MDR incorporates the motor within the body of the roller and thereby saves space for power transmission purposes. Additionally, the MDR prevents damage to inventory items by running on only 24 volt and thereby not being overpowered and damaging inventory items when they come into contact with the MDR. In some examples, the MDR may include sensors and controls which sense resistance or other parameters and control power supplied to the MDR. Additionally, an MDR may be driven using 120/240 volt motors.

A first lateral edge 122 of the orienting apparatus 104 and a second lateral edge 121, together with the driving roller, define a channel through which inventory items are moved during operation. A size of inventory items handled by the orienting apparatus 104 may be determined based on the size of items the associated packaging machine 106 is configured to handle. In particular, the maximum height of an inventory item that may be packaged by packaging machine 106 defines a width of the inlet, as defined between the first lateral edge 122 and the second lateral edge 121. For example, a packaging machine 106 may be configured to package inventory items of a maximum size of twelve inches (approximately 30 cm) by three and one-half inches (approximately 9 cm) and therefore, the width of the inlet, between the first lateral edge 122 and the second lateral edge 121 may be approximately twelve inches (approximately 30 cm) so when the inventory item is rotated to a vertical orientation, the width of the inlet matches the height of the unsealed envelope 110. This sizing may ensure that inventory items which are too large for a packaging machine 106 are not forced into unsealed envelope 110 causing packing errors and disrupting the packaging machine 106.

At the opposite end of orienting apparatus 104 from the inlet is the outlet, defined by a first lateral edge 124 and a second lateral edge 123. The first lateral edge 124 at the outlet and the first lateral edge 122 at the inlet define a first side of the orienting apparatus 104. Along the first side are a series of guide rollers 118, including MDR which may operate independently or as a zone based off of a single MDR. The second lateral edge 123 of the outlet and the second lateral edge 121 of the inlet define a second side of the orienting apparatus 104. Along the second side are a series of orienting rollers, described below which also include MDR and may be driven independently of one another. The outlet, as defined by the first lateral edge 124, the second lateral edge 123, the top of orienting apparatus 104 and the bottom of orienting apparatus 104 may have dimensions matching or approximately the same as the dimensions of the opening of unsealed envelope 110.

Figure 3:
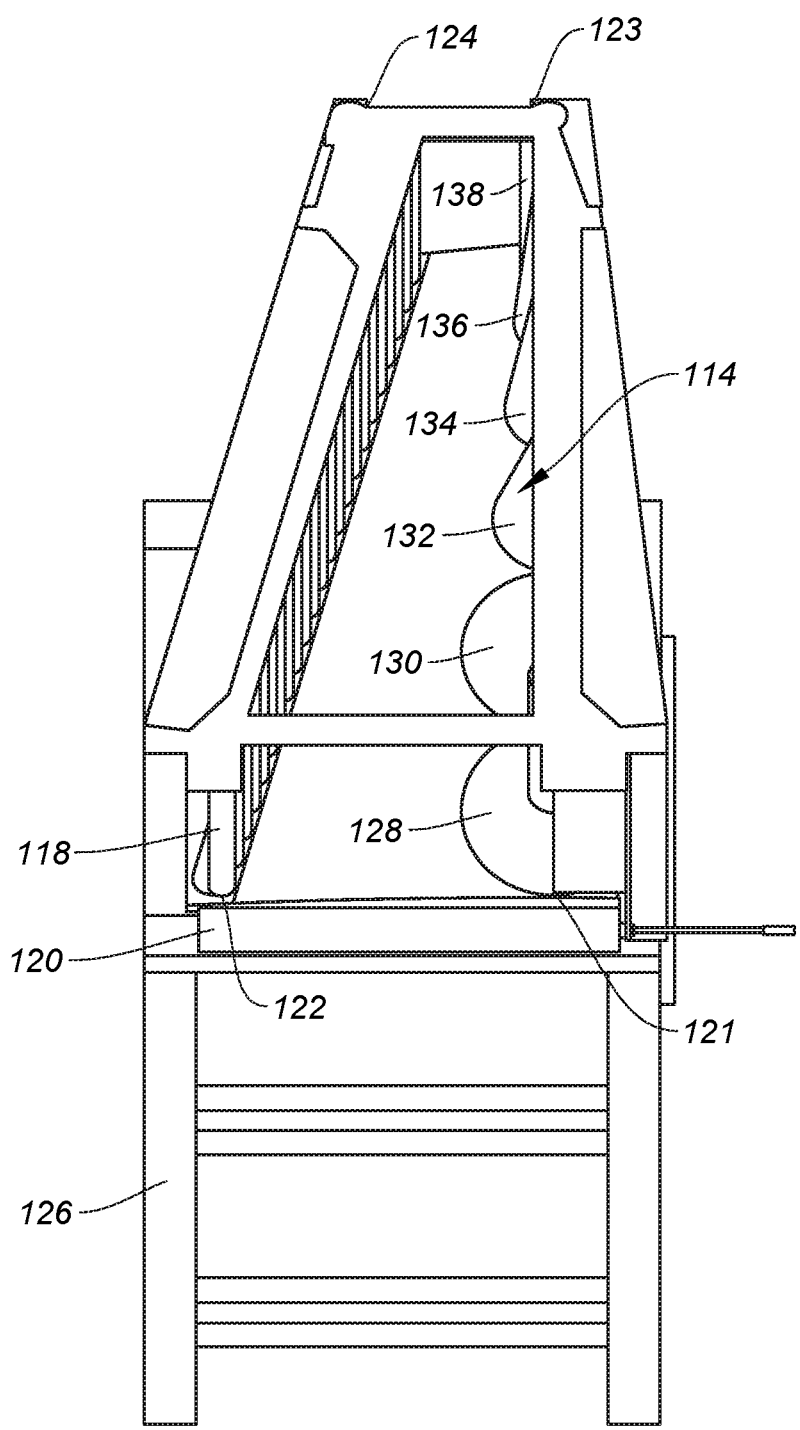
FIG. 3 further illustrates the orienting apparatus of FIG. 1 with an upper cover removed to better illustrate components of the orienting apparatus.

FIG. 3 depicts a section view the orienting apparatus of FIG. 1 with the upper cover or top removed. The guide rollers 118 and the orienting rollers 114 line the edges of the channel formed within the orienting apparatus 104. The channel narrows from a first width at the inlet to a second width at the outlet, the width at the inlet defining a maximum height of inventory item to be packaged by a packaging machine 106, and the width at the outlet defining a maximum width of inventory item to be packaged. Though a particular number of guide rollers 118 are depicted in FIG. 3, varying numbers and spacing of guide rollers 118 may be used, so long as the inventory item may be advanced by contact with the guide rollers 118.

Orienting rollers 114 include a plurality of MDR having conical shapes thereon. Conical shapes include frustoconical shapes and other similar shapes. At or near the inlet the conical shape on the first orienting roller 128 may be have a first diameter, while the conical shape at or near the outlet may have a second diameter. The first diameter is greater than the second diameter. In some examples, the diameter of the conical shapes may remain constant or increase progressively from the inlet to the outlet. In some examples, the conical shape may be a shape besides conical or frustoconical. For example, the lateral edges of the conical shapes may have curved profiles. Examples of the conical shape including non-conical profiles will include a base portion having a larger diameter than an upper portion of the conical shape to cause orientation of the inventory item when in use. The second orienting roller 130, third orienting roller 132, fourth orienting roller 134, and fifth orienting roller 136 may include conical shapes have smaller diameters as described above, but also include varying heights, increasing progressively from the inlet to the outlet, as described with respect to FIG. 4 below. At the outlet, a sixth roller 138 may include an MDR but not any conical shape, and instead have a cylindrical profile defining the outlet of the orienting apparatus 104. Though a particular number of orienting rollers are depicted herein, the number of orienting rollers 114 may vary, so long as the dimensions of the conical shapes thereon follows the description above, with a decreasing diameter from inlet to outlet.

In some examples, the orienting rollers 114 may include more than one conical shape. For example, multiple conical shapes may be on a first orienting roller 128 to orient the inventory item vertically as well as roll the inventory item about an axis perpendicular to the orienting rollers 114. In at least one example, the multiple conical shapes described above may include a first conical shape and an inverted second conical shape, wherein the first conical shape and the second conical shape together form an hourglass shape.

Each of the guide rollers 118 and the orienting rollers 114 includes a rubberized coating or surface which provides a frictional interface to interact with inventory items. The rubberized coating has a durometer rating in a range of fifty to sixty. The lower the durometer rating, the greater the friction experienced between the roller and the inventory item. Increased durometer ratings typically result in more durable rubberized coatings. The rubberized coating may be made of a rubber, silicone, or other elastomer materials.

Along the bottom of orienting apparatus 104, and the bottom surface of the channel defined by the guide rollers 118 and the orienting rollers 114 is a static plate. The static plate or bottom of the channel includes a material or surface having a low coefficient of friction, to ensure inventory items don't experience excessive friction and prevent advancement of the item through the orienting apparatus 104. The surface may have a coefficient of friction less than 0.1 to ensure that the inventory item moves along the surface. For example, the surface may be dimpled, waxed, or otherwise coated with a material having a low coefficient of friction. In some examples, an air table may be used to produce an air cushion on which inventory items may move with very low friction.

Figure 4:
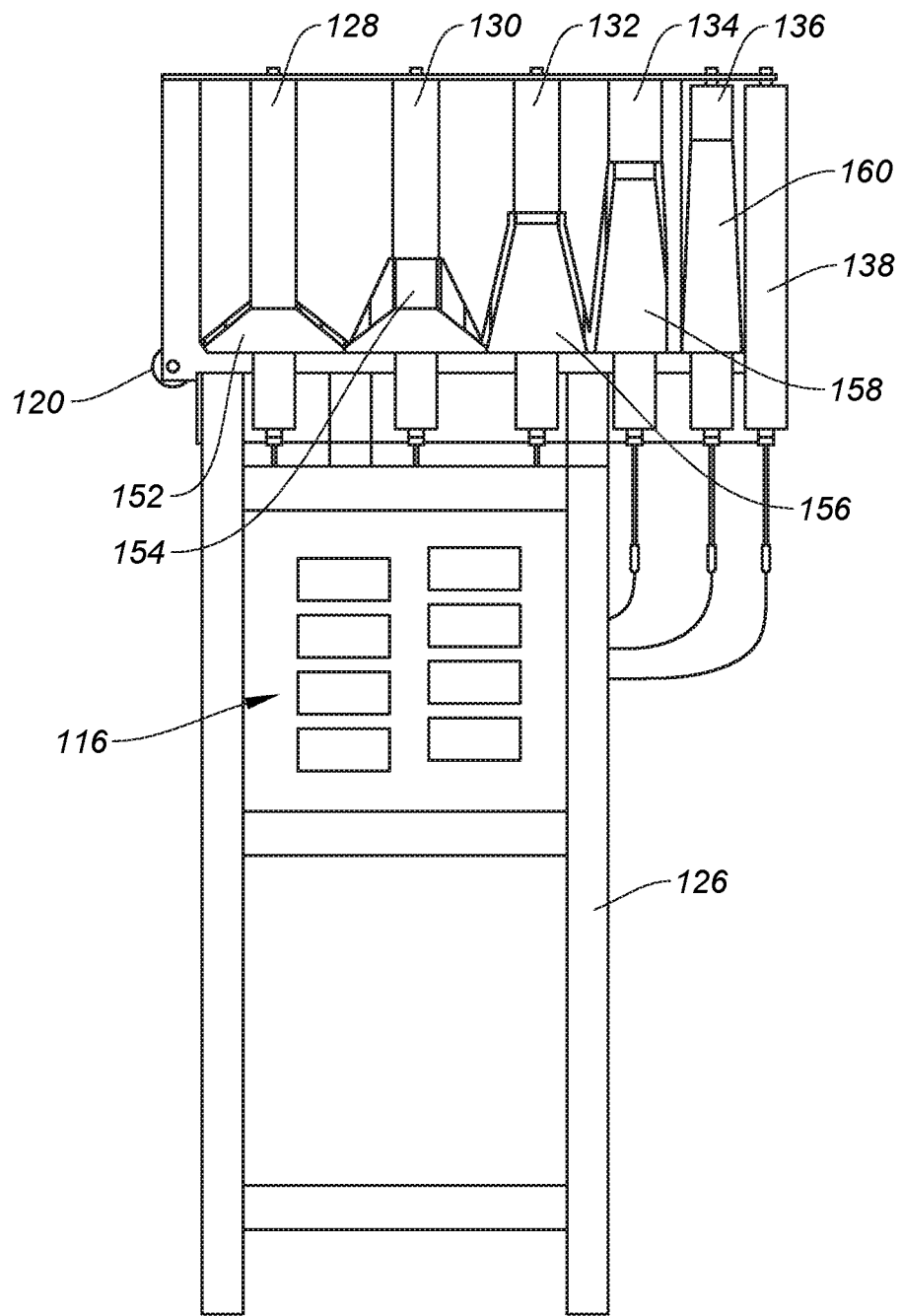
FIG. 4 is a side view of the orienting apparatus of FIG. 1 with a side cover removed to better illustrate components of the orienting apparatus.

FIG. 4 depicts a side view of the orienting apparatus of FIG. 1, with a side cover removed to show the orienting rollers 114. Each of the orienting rollers 114 has a rotation axis, which is vertical, about which each of the orienting rollers rotates. The orienting rollers 114 each have a non-cylindrical portion fitted onto a roller. In some examples, the non-cylindrical portion is only a fraction of the height of the orienting rollers 114, while in some examples it extends nearly the full height. The first orienting roller 128 includes a first conical shape 152 having a first height and a first diameter. The second orienting roller 130 has a second conical shape 154 having a second height and a second diameter. The third orienting roller 132 includes a third conical shape 156 having a third height and a third diameter. The fourth orienting roller 134 has a fourth conical shape 158 having a fourth height and a fourth diameter. The fifth orienting roller 136 includes a fifth conical shape 160 having a fifth height and a fifth diameter. The diameters of the first conical shape through the fifth conical shape decreases, as described above, progressively from the inlet to the outlet. The height of the conical shapes increases progressively, from the first height to the fifth height. The height or diameter may increase or decrease at any rate, such as linearly, exponentially, or according to any other function. Each of the orienting rollers 114 is connected, electrically, to the computer system 116 and may be independently monitored and controlled. In at least one example, the speed of the orienting rollers may be varied according to a packaging speed of the packaging machine 106.

In operation, the orienting rollers 114 each rotate clockwise. As an inventory item enters the inlet and is propelled by driving roller 120, the low and wide first conical section lifts one edge of the inventory item positioned at or near the orienting rollers 114. As the orienting rollers 114 and the guide rollers 118 (which rotate counter-clockwise) advance the inventory item, the increasing height of the conical shapes lifts the edge of the inventory item further and further, progressively, through the frictional interface of the rotating conical shapes and the inventory item, until the inventory item is substantially vertical and oriented to exit through the outlet.

Figure 5:
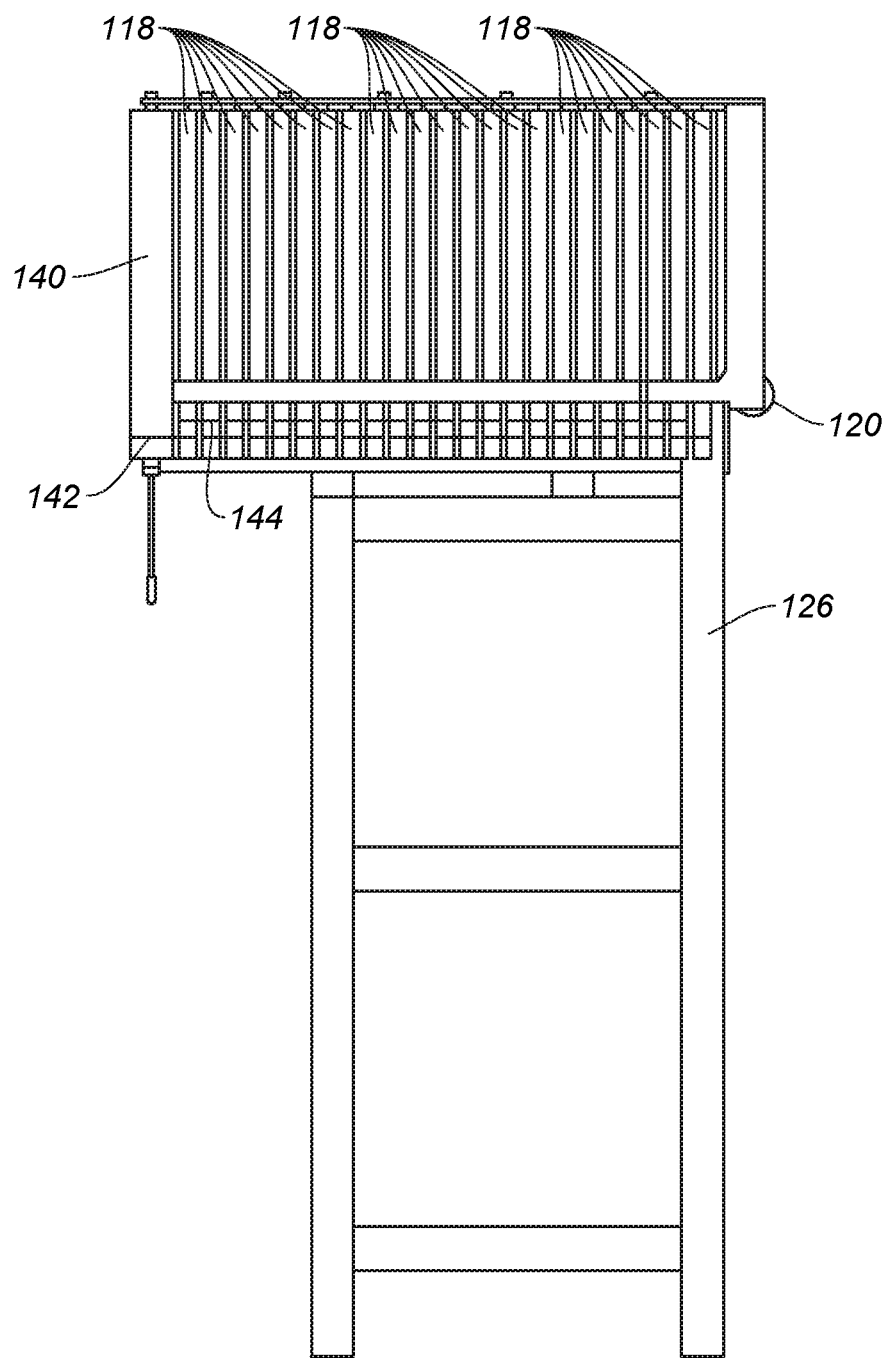
FIG. 5 is a side view of the orienting apparatus of FIG. 1 with a side cover removed to better illustrate components of the orienting apparatus.

FIG. 5 depicts the opposite side of the orienting apparatus of FIG. 4, with a side cover removed to show the guide rollers 118. The guide rollers 118 are each of a consistent diameter and length and are spaced evenly from the inlet to the outlet. Each of the guide rollers 118 may be a MDR and driven independently. As shown in FIG. 5, the guide rollers 118 are linked by belts 142, 144 forming a guide roller section. In particular, exit roller 140 at the outlet of the orienting apparatus 104 is a MDR controlled by the computer system 116. The exit roller 140 is coupled, via a belt 142 to an adjacent guide roller 118. The adjacent guide roller 118 is coupled, via a belt 144, to a second adjacent guide roller 118. The guide rollers 118 may likewise all be connected, via belts, to adjacent guide rollers 118 and thereby be driven with a single MDR at exit roller 140.

Figure 6:
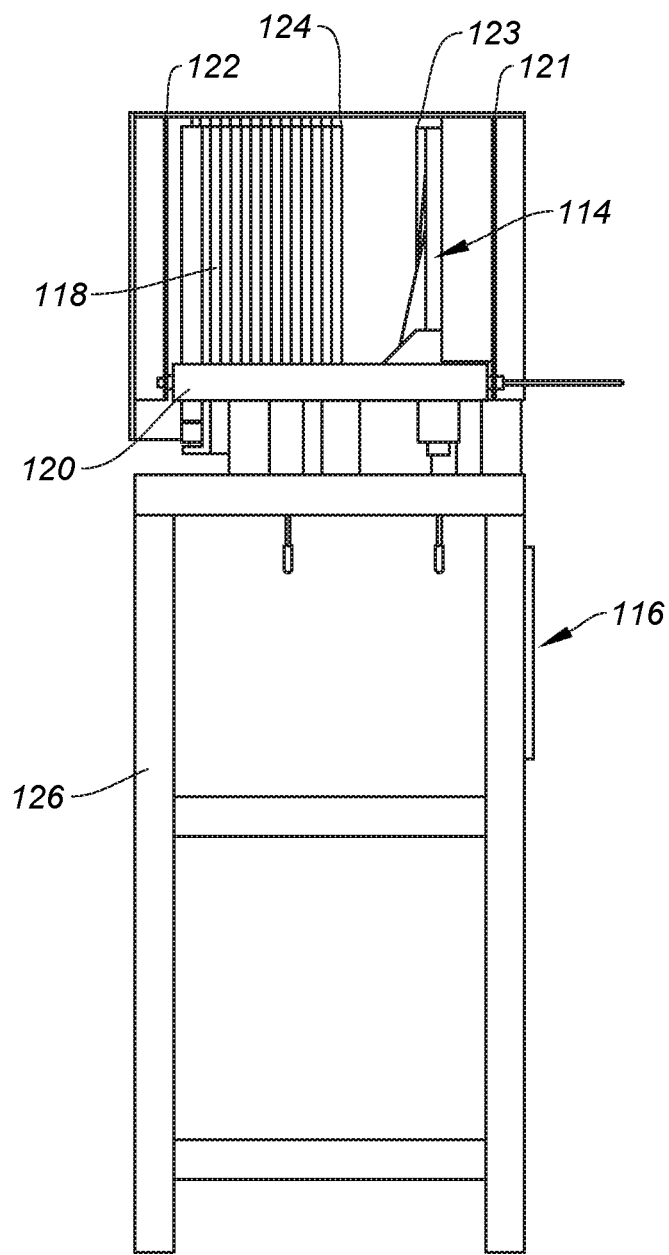
FIG. 6 is a front view of the orienting apparatus of FIG. 1.

FIG. 6 depicts a front view of the orienting apparatus 104 of FIG. 1, the view depicting the orienting apparatus from the inlet to the outlet. The guide rollers 118 are shown directing to angling towards the orienting rollers 114, thereby ensuring that an inventory item will be pressed against the orienting rollers 114 and re rotated by the conical shapes thereof. The increasing height of the conical shapes on each of the orienting rollers 114 is displayed, as described above, with the progressively increasing height and decreasing diameter as the channel, defined by the orienting rollers 114 and the guide rollers 118, narrows to the width of the unsealed envelope 110 at the packaging machine 106.

In some examples, guide rollers 118 or orienting rollers 114 may be on a pivoting frame, having a pivot point at the lateral edge of the outlet, with the distal end of the frame, at the inlet free to pivot to widen or narrow the inlet. For example, the frame may include a spring or tension device to narrow the opening of the inlet by pivoting the frame such that the orienting rollers 114 and the guide rollers 118 at the inlet are nearer. As an inventory item is introduced at the inlet, the inventory item is forced into the non-cylindrical section of the orienting rollers 114 by the guide rollers 118. When inventory items are larger than the narrower opening at the inlet, the frame will pivot, due to the force of the larger inventory item pressing against the guide rollers 118 thereby enlarging the opening while still ensuring the edge of the inventory item contacts the non-cylindrical section of the orienting rollers 114.

Figure 7:
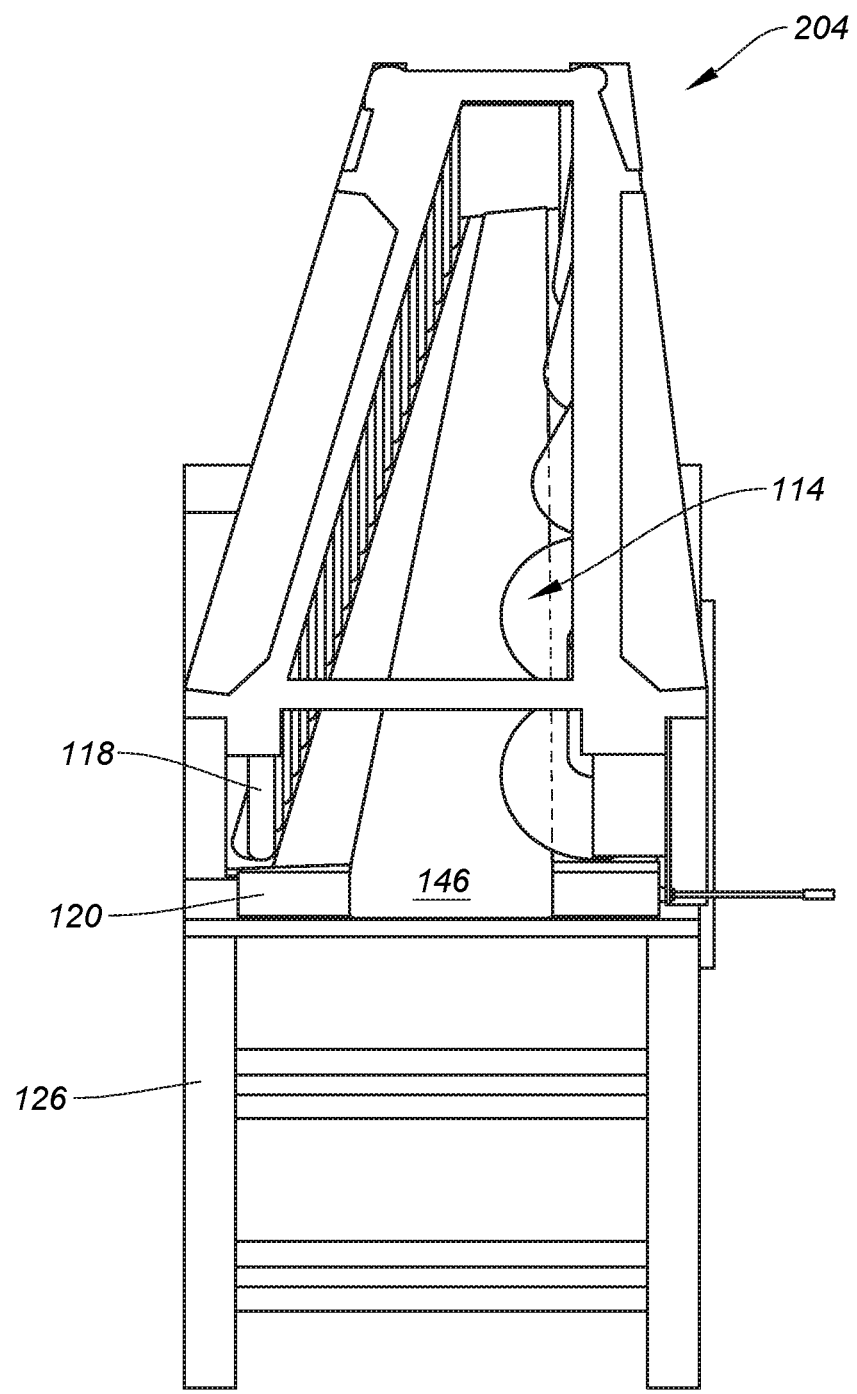
FIG. 7 illustrates an embodiment of an orienting apparatus that includes a conveyor belt.

FIG. 7 depicts an orienting apparatus 204, similar to those described above, including a conveyor belt 146 for advancing an inventory item through the orienting apparatus 204. Other elements of the orienting apparatus 204 are the same as those described above, and share identical numbering.

The conveyor belt 146 includes a narrow conveyor band and is driven by driving roller 120. Rather than instantaneously imparting momentum to the inventory item, the driving roller may drive the conveyor belt to continuously apply force to advance the inventory item. This may be of particular benefit with inventory items of a flexible nature, or which interact with a stationary surface in such a way that a coefficient of friction between the two may not be sufficiently low to allow the inventory item to advance freely. In the case of a flexible inventory item, the conveyor belt may prevent the inventory item from being locally deformed by the guide rollers 118 or the orienting rollers 114 without advancing through the orienting apparatus or rotating to a substantially vertical orientation.

Figure 8:
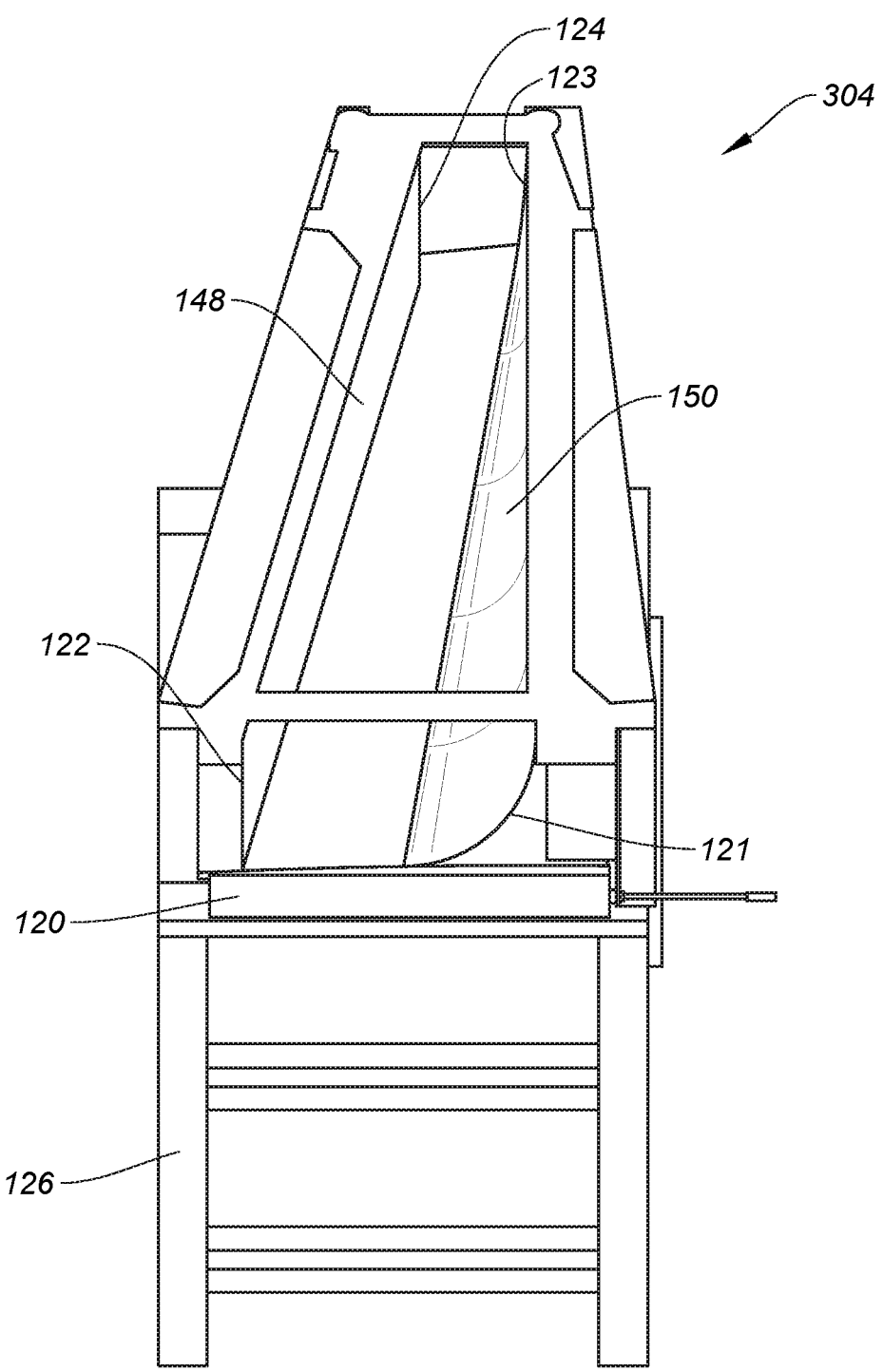
FIG. 8 illustrates an embodiment of an orienting apparatus that includes guide surfaces for orienting an item.

FIG. 8 depicts an example orienting apparatus 304 including guide surfaces for orienting the inventory items without the use of individual rollers. Other elements of the apparatus including identical numbers to parts described above are similar or identical. A guide surface 148 is included between the first lateral edge 122 at the inlet and the first lateral edge 124 at the outlet. The guide surface 148 has a low coefficient of friction to allow inventory items, propelled by driving roller 120 to advance through the orienting apparatus 304.

An orienting surface 150 extends from the inlet to the outlet, connecting the second lateral edge 121 of the inlet, the bottom of the inlet, and the second lateral edge 123 of the outlet. The orienting surface 150 may likewise have a low coefficient of friction, be formed of a metallic or other solid material such as a plastic, and have some kind of surface texturing such as dimpling or coating as described above. The orienting surface 150 may have a contour in at least two dimensions, and match or approximate the contour provided by the orienting rollers 114 in other examples described above. In particular, at the inlet, the orienting surface 150 includes a horizontal and a vertical portion, coupling to the second lateral edge 121 and the bottom of the inlet. The orienting surface 150 curves or has a profile that transitions from the horizontal and vertical portions at the inlet to a vertical portion only at the outlet, the vertical portion coupled to the second lateral edge 123 of the outlet.

In some examples, an orienting apparatus 304 may include a guide surface 148 opposite orienting rollers 114, with the guide surface 148 narrowing the channel within the orienting apparatus and ensuring the inventory item contacts the orienting rollers 114. In some other examples, an orienting apparatus 304 may include guide rollers 118, either driven by an MDR or free to rotate about their rotation axis, opposite orienting surface 150.

Figure 9:
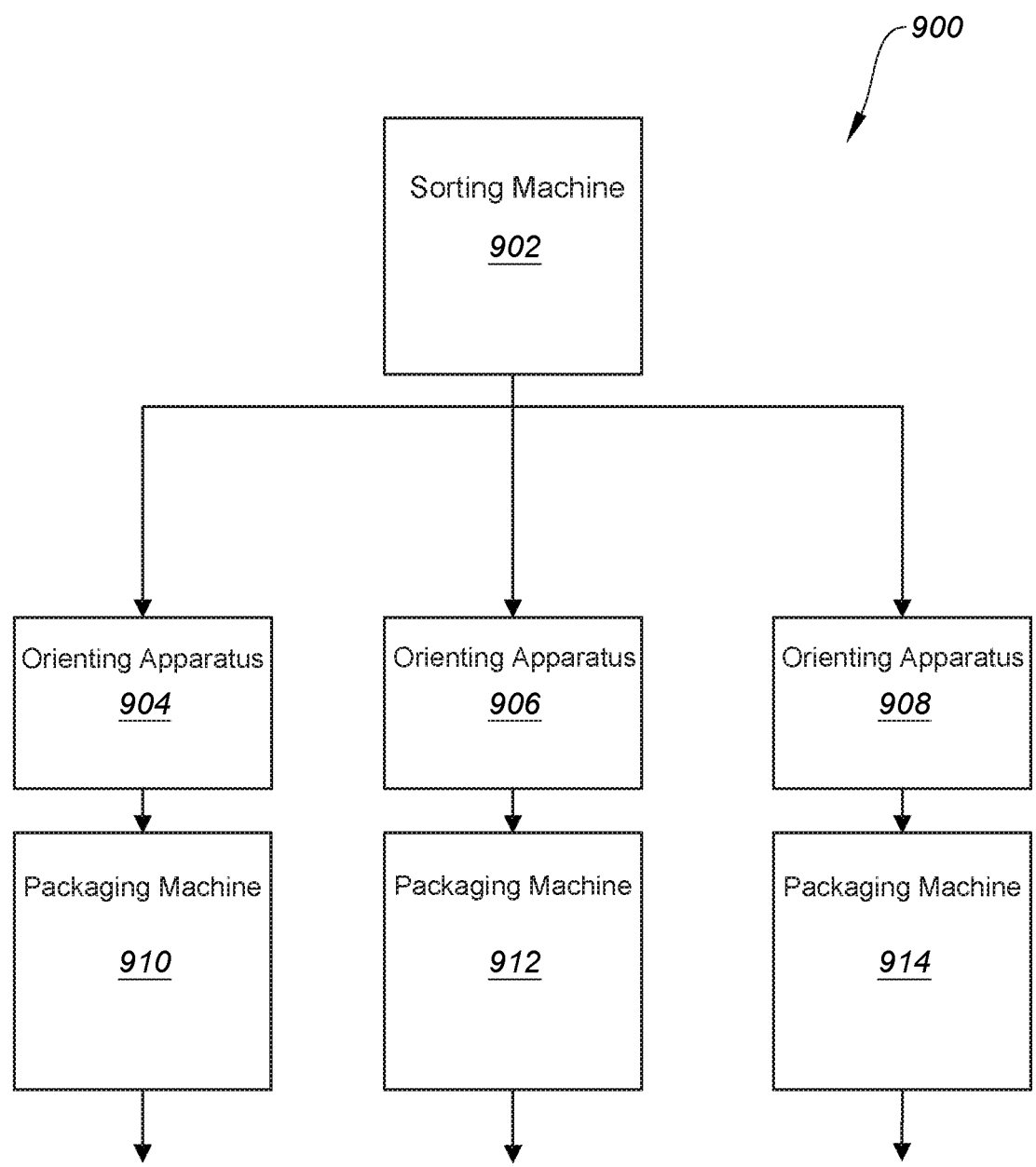
FIG. 9 is a simplified block diagram depicting a sorting and packaging system incorporating multiple orienting apparatuses and packaging machines.

FIG. 9 depicts a block diagram of an inventory handling system 900 incorporating a sorting machine 902 for sorting inventory items according to their size or dimensions. Such an inventory handling system may be able to sort and package inventory items more quickly and efficiently than other systems due to automation at each step of the process. The inventory handling system 900 includes a first orienting apparatus 904, a second orienting apparatus 906, and a third orienting apparatus connected, via conveyor systems such as conveyor belts or other transport systems, to the sorting machine 902. The first orienting apparatus 904 is sized, at the inlet and outlet, to handle and orient inventory items of a first size, having dimensions within a first height and width range. The second orienting apparatus 906 is sized, at the inlet and outlet, to handle and orient inventory items of a second size, having dimensions within a second height and width range. The third orienting apparatus 908 is sized, at the inlet and the outlet, to handle and orient inventory items for packaging of a third size, having dimensions within a third height and width range.

At the outlet of each of the first orienting apparatus 904, the second orienting apparatus 906, and the third orienting apparatus 908 are a first packaging machine 910, a second packaging machine 912, and a third packaging machine 914, respectively. The first packaging machine 910 has an unsealed envelope of the first size, having dimensions corresponding to the maximum of the first height and width range. The second packaging machine 912 has an unsealed envelope of the second size, having dimensions corresponding to the maximum of the second height and width range. The third packaging machine 914 has an unsealed envelope of the third size, having dimensions corresponding to the maximum of the third height and width range.

In operation, inventory items may be delivered to the sorting machine 902 which sorts the inventory items according to the first size, the second size, or the third size and based on the sorting size directs the inventory items, via a conveyor system, to the first orienting apparatus 904, the second orienting apparatus 906, or the third orienting apparatus 908 where each orienting apparatus 904, 906, 908 orients the inventory item in a substantially vertical orientation for packaging and delivers the inventory item to the first packaging machine 910, the second packaging machine 912, or the third packaging machine 914, respectively.

Figure 10:
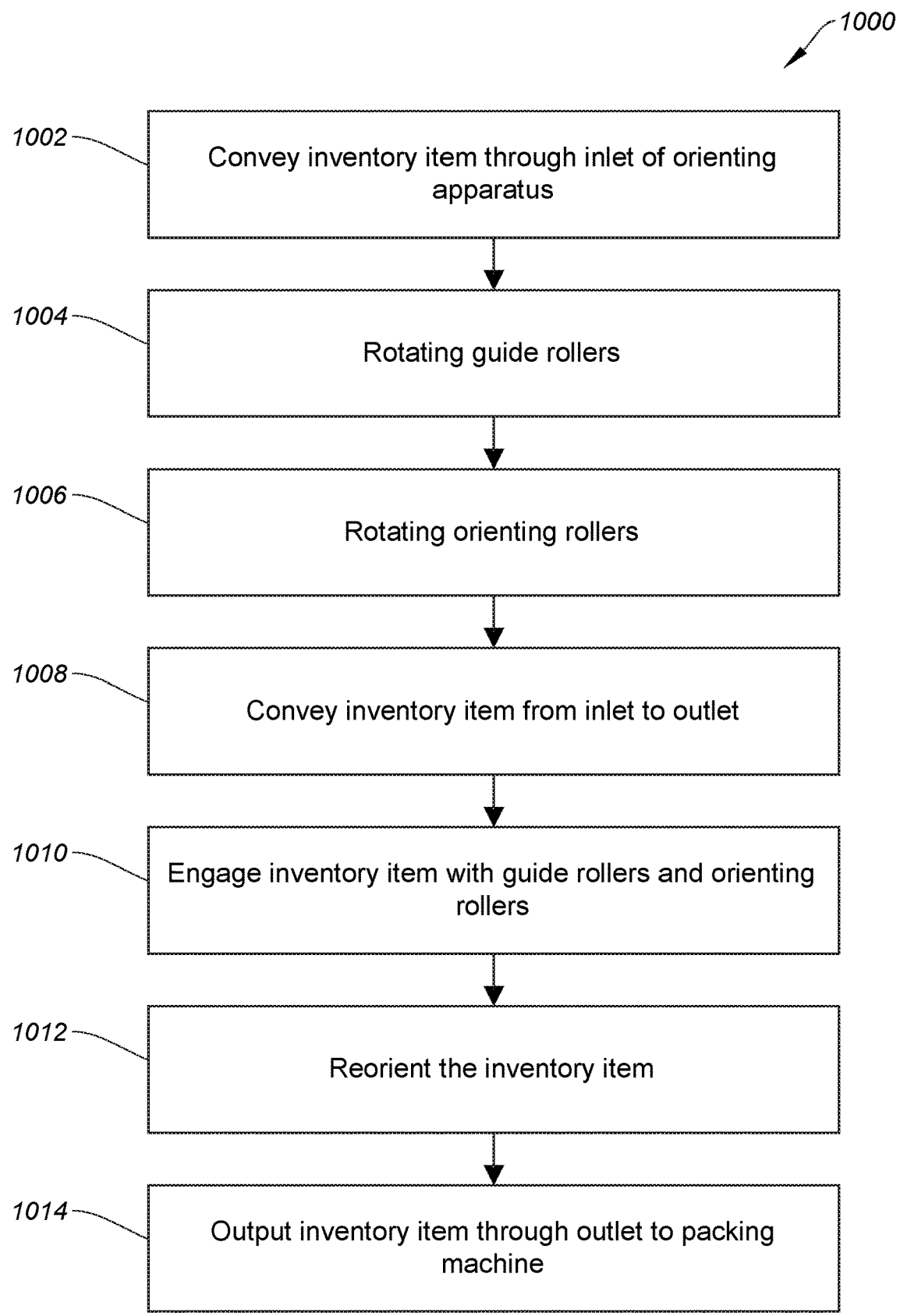
FIG. 10 is a simplified block diagram depicting a method of orienting items using an orienting apparatus.

FIG. 10 is a block diagram depicting a process 1000 for orienting an inventory item using an orienting apparatus 104 and delivering an inventory item in a substantially vertical orientation to a packaging machine 106. Some or all of the process 1000 (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

At step 1002, an inventory item is conveyed to and through an inlet of the orienting apparatus 104. In some examples this includes delivering the inventory item via conveyor belt 102. At step 1004, the guide rollers 118 are rotated, counter-clockwise either individually or by instructing an exit roller 140 coupled to the guide rollers 118 to rotate. In some examples, the guide rollers 118 and the orienting rollers 114 may be on opposite sides of the orienting apparatus 104 to the example shown in FIG. 6, in which case, the guide rollers 118 will rotate clockwise. At step 1006, the orienting rollers 114, including non-cylindrical sections such as the conical sections described above or alternatives, are rotated clockwise. As with the guide rollers 118, in an example where the orienting rollers 114 are on the opposite side of the orienting apparatus 104 than shown in FIG. 6, the orienting rollers 114 will rotate counter-clockwise.

At step 1008, the inventory item is conveyed from the inlet of the orienting apparatus 104 to the outlet. This step may be accomplished by rotating driving roller 120 to impart instantaneous momentum to the inventory item to propel it through the orienting apparatus 104 or, in some examples may be accomplished through the use of a conveyor belt 146 driven by driving roller 120.

As the inventory item is conveyed through the orienting apparatus, at step 1010, the inventory item engages with the guide rollers 118 and the orienting rollers 114. The non-cylindrical sections of the orienting rollers 114 will progressively raise or lift an edge of the inventory item which is in contact with the orienting rollers by increasing the height of the non-cylindrical section progressively through the length of the orienting apparatus 104. At step 1012, the inventory item is reoriented to be in a vertical orientation, to be inserted into the unsealed envelope 110 of the packaging machine 106 as described herein. At step 1014, the inventory item is output, either using momentum imparted to the inventory item by the orienting apparatus 104 or through the use of final rollers to push the inventory item into the unsealed envelope 110 of the packaging machine 106.

Figure 11:
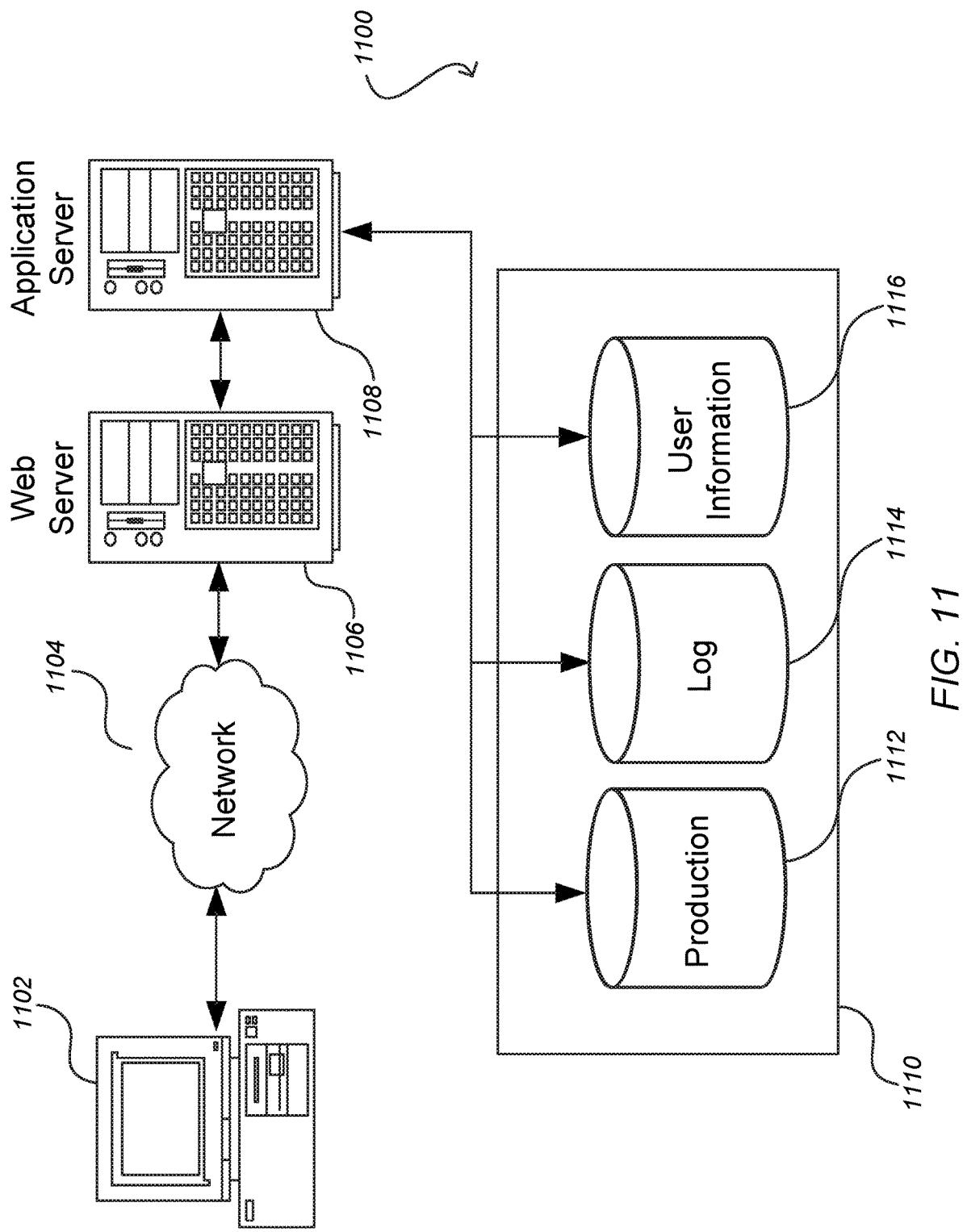
FIG. 11 illustrates an environment in which various embodiments can be implemented.

FIG. 11 illustrates a system 1100 and aspects of an example environment for implementing aspects in accordance with various embodiments. As will be appreciated, although a Web-based environment is used for purposes of explanation, different environments may be used, as appropriate, to implement various embodiments. The environment includes an electronic client device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the client device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. An inventory handling system, comprising:
    a packaging machine configured to package an inventory item;
    an orienting apparatus configured to reorient the inventory item and transfer the inventory item to the packaging machine, the orienting apparatus comprising:
        an inlet configured to receive the inventory item;
        an outlet via which the reoriented inventory item is output to the packing machine, the outlet having an aspect ratio less than one;
        a rotating horizontal driving roller configured to engage the inventory item to drive the inventory item towards the outlet, the rotating horizontal driving roller positioned at a bottom edge of the inlet;
        rotating guide rollers positioned between a first lateral side of the inlet and a first lateral side of the outlet, each of the rotating guide rollers being rotated around a respective guide roller rotation axis that is vertically oriented; and
        rotating orienting rollers positioned between a second lateral side of the inlet and a second lateral side the outlet, the second lateral side of the inlet being disposed opposite to the first lateral side of the inlet, the second lateral side of the outlet being disposed opposite to the first lateral side of the outlet, each of the rotating orienting rollers having a non-cylindrical section and being rotated around a respective orienting roller rotation axis that is vertically oriented, wherein a height of each of the non-cylindrical sections increases progressively from the inlet to the outlet, wherein the rotating guide rollers and the rotating orienting rollers define a channel through which the inventory item is conveyed, the channel having a width that decreases progressively from the inlet to the outlet; and
    a supply conveyer that conveys the inventory item to the inlet of the orienting apparatus.

2. The inventory handling system of claim 1, wherein the non-cylindrical section of at least one of the rotating orienting rollers is conical.

3. The inventory handling system of claim 1, wherein a bottom diameter of the non-cylindrical section decreases progressively from the inlet to the outlet.

4. The inventory handling system of claim 1, wherein at least one of the rotating orienting rollers comprises a rubber surface having a durometer of between 50 and 60.

5. An orienting apparatus configured to reorient an inventory item, the orienting apparatus comprising:
    an inlet configured to receive the inventory item;
    an outlet through which the inventory item is output, the outlet having an aspect ratio less than one;
    a translation device configured to drive the inventory item from the inlet towards the outlet;
    a vertically oriented guide positioned between a first lateral side of the inlet and a first lateral side of the outlet; and
    an orienting guide positioned between a second lateral side of the inlet and a second lateral side the outlet, the second lateral side of the inlet being disposed opposite to the first lateral side of the inlet, the second lateral side of the outlet being disposed opposite to the first lateral side of the outlet, the vertically oriented guide and the orienting guide defining a channel through which the inventory item is conveyed, the channel having a width that decreases progressively from the inlet to the outlet, the orienting guide being configured to interface with the inventory item to progressively reorient the inventory item as the inventory item is conveyed through the channel.

6. The orienting apparatus of claim 5, wherein the translation device comprises a conveyor belt that extends along a bottom of the channel.

7. The orienting apparatus of claim 6, wherein the vertically oriented guide comprises a vertical surface having a coefficient of friction less than 0.1.

8. The orienting apparatus of claim 6, wherein the orienting guide comprises a surface having a contour extending from the inlet to the outlet, the contour comprising a substantially horizontal portion and a substantially vertical portion at the inlet and a predominantly vertical portion at the outlet.

9. The orienting apparatus of claim 5, wherein the vertically oriented guide comprises rotating rollers, with each of the rotating guide rollers being rotated around a respective roller rotation axis that is vertically oriented.

10. The orienting apparatus of claim 5, wherein the orienting guide comprises orienting rollers, each of the orienting rollers having a non-cylindrical section and being rotated around a respective orienting roller rotation axis that is vertically oriented, wherein a height of each of the non-cylindrical sections increases progressively from the inlet to the outlet.

11. The orienting apparatus of claim 10, wherein a diameter of each of the non-cylindrical sections decreases progressively from the inlet to the outlet.

12. The orienting apparatus of claim 10, wherein each of the orienting rollers comprise a rubber surface having a durometer in a range of 50 to 60.

13. The orienting apparatus of claim 5, wherein the position of the vertically oriented guide is adjustable at the inlet, such that a width of the inlet defined by the vertically oriented guide and the orienting guide is adjustable.

14. A method of reorienting an inventory item for delivery to a packing machine, the method comprising:
conveying an inventory item through an inlet of an orienting apparatus that includes a guide roller assembly and an orienting roller assembly, the guide roller assembly comprising a sequence of guide rollers, the orienting roller assembly comprising a sequence of orienting rollers, the guide rollers and the orienting rollers defining a channel through which the inventory item is conveyed from the inlet to an outlet of the orienting apparatus, the channel having a width that decreases progressively from the inlet to the outlet, each of the orienting rollers having a non-cylindrical section, wherein a height of each of the non-cylindrical sections increases progressively from the inlet to the outlet;
rotating a plurality of the guide rollers via a guide roller drive assembly drivingly coupled with the plurality of the guide rollers, each of the guide rollers being rotated around a respective guide roller axis that is vertically oriented;
rotating a plurality of the orienting rollers via an orienting roller drive assembly drivingly coupled with the plurality of the orienting rollers, each of the orienting rollers being rotated around a respective orienting roller axis that is vertically oriented; and
engaging the inventory item with the guide roller assembly and the orienting roller assembly to:
convey the inventory item through the channel to the outlet,
reorient the inventory item, and
output the reoriented inventory item through the outlet for delivery to the packing machine.

15. The method of claim 14, wherein each of the plurality of orienting rollers comprises a rubber surface having a durometer in a range of 50 to 60.

16. The method of claim 14, wherein the non-cylindrical section of each of the orienting rollers includes a base and an upper portion, the base having a larger diameter than a diameter of the upper portion.

17. The method of claim 14, wherein the non-cylindrical section of each of the orienting rollers comprises a conical shape.

18. The method of claim 14, wherein conveying the inventory item through the inlet comprises engaging the inventory item with a rotating horizontal driving roller configured to drive the inventory item towards the outlet, the rotating horizontal driving roller positioned at a bottom edge of the inlet.

19. The method of claim 14, wherein conveying the inventory item through the inlet comprises engaging the inventory item with a horizontal conveyor belt configured to carry the inventory item from the inlet towards the outlet.

20. The method of claim 14, wherein reorienting the inventory item comprises rotating the inventory item from a substantially horizontal position to a substantially vertical position.

* * * * *